(12) United States Patent
Kairys (10) Patent No.: US 9,924,630 B2
(45) Date of Patent: Mar. 27, 2018

(54) DEVICE FOR CONNECTING TWO RAKES (71) Applicant: Luitauras Kairys, Palos Hills, IL (US)

(72) Inventor: Luitauras Kairys, Palos Hills, IL (US)

( * ) Notice: Subject to any disclaimer, the term of this patent is extended or adjusted under 35 U.S.C. 154(b) by 0 days.

(21) Appl. No.: 14/941,557

(22) Filed: Nov. 14, 2015

(65) Prior Publication Data
US 2016/0138632 A1 May 19, 2016

Related U.S. Application Data
(60) Provisional application No. 62/080,084, filed on Nov. 14, 2014.

(51) Int. Cl.
*A01D 7/10* (2006.01)
(52) U.S. Cl.
CPC ..................................... *A01D 7/10* (2013.01)
(58) Field of Classification Search
CPC .. A01D 7/10; A01D 9/06; A01D 11/06; F16B 7/044
USPC ..................................... 56/400.12; 294/50.6
See application file for complete search history.

(56) References Cited

U.S. PATENT DOCUMENTS

| | | | |
|---|---|---|---|
| 318,359 A | 5/1885 | Davis | |
| 764,401 A | 7/1904 | Wegner | |
| 1,160,282 A | 11/1915 | Harris et al. | |
| 1,588,927 A | 6/1926 | Willis | |
| 2,521,441 A | 9/1950 | Bickley | |
| 2,908,131 A | 10/1959 | Lofton | |
| 3,643,410 A | 2/1972 | Menning | |
| 3,688,484 A | 9/1972 | Cox | |
| 3,833,250 A | 9/1974 | Lawrence | |
| 4,018,038 A | 4/1977 | Sipe | |
| 4,292,794 A | 10/1981 | Gascon | |
| 4,477,114 A | 10/1984 | Callis | |
| 5,069,026 A | 12/1991 | Johnson | |
| 5,133,177 A | 7/1992 | Miller | |
| 5,459,988 A | 10/1995 | Glaser | |
| 5,499,852 A | 3/1996 | Seigendall | |
| 5,901,540 A * | 5/1999 | Vella ........................ | A01D 7/10 294/50.6 |
| 6,095,579 A | 8/2000 | Nichols | |
| 6,151,878 A | 11/2000 | Kalavitis | |
| 6,394,327 B1 | 5/2002 | Mietlicki | |
| 6,886,319 B2 * | 5/2005 | Nam ........................ | A01D 7/00 56/400.12 |

(Continued)

*Primary Examiner* — John Weiss
(74) *Attorney, Agent, or Firm* — Erickson Law Group, PC (57) ABSTRACT

A device for connecting two rakes to gather and/or pick up loose materials is disclosed. The device has a first handle attachment and a second handle attachment. The first handle attachment has a first projection and a first recess. The second handle attachment has a second projection and a second recess. The first projection is removably receivable in the second recess and the second projection is removably receivable in the first recess to join the first handle attachment to the second handle attachment. When the first projection is received in the second recess and the second projection received the first recess the first and second handle attachments are positionable in an open position where the first bottom end of the first attachment is spaced apart from the second bottom end of the second attachment and a closed position where the first bottom end is adjacent the second bottom end.

20 Claims, 9 Drawing Sheets (56) References Cited

U.S. PATENT DOCUMENTS

| | | | |
|---|---|---|---|
| 6,904,743 B2 * | 6/2005 | Vodinh | A01D 7/00 |
| | | | 294/50.5 |
| 7,131,255 B1 | 11/2006 | Caneba | |
| 7,168,230 B1 | 1/2007 | Waddell | |
| 7,363,755 B1 | 4/2008 | Caneba | |
| D582,737 S | 12/2008 | Mullen | |
| 7,661,258 B1 | 2/2010 | Petruzelli | |
| 7,703,822 B1 | 4/2010 | Giacalone | |
| 8,448,306 B2 * | 5/2013 | Garcia | G01R 1/06788 |
| | | | 24/339 |
| D701,097 S | 3/2014 | Petruzzelli et al. | |
| 8,707,491 B1 | 4/2014 | Dykyj et al. | |
| 2002/0088092 A1 | 7/2002 | Cavalheiro | |
| 2003/0173789 A1 | 9/2003 | Piscopo et al. | |
| 2005/0172604 A1 | 8/2005 | Vodinh | |
| 2007/0119141 A1 | 5/2007 | Foss | |
| 2010/0013253 A1 | 1/2010 | Hopp | |
| 2013/0283753 A1 | 10/2013 | Sturges et al. | |

\* cited by examiner

DEVICE FOR CONNECTING TWO RAKES

This application claims the benefit of U.S. Provisional Patent Application No. 62/080,084, filed on Nov. 14, 2014, which is herein incorporated by reference.

FIELD OF THE INVENTION

This invention relates in general to devices for rakes.

BACKGROUND OF THE INVENTION

Gathering loose materials, such as leaves, can be done using a hand tool, such as a rake. A traditional rake has a long handle with the rake implement operated close to the ground or surface having the leaves and the user standing holding the handle opposite the rake implement.

Once the leaves are gathered, it is often desired to lift the gathered leaves for placement in a container for transport or disposal. A user often encounters difficulty in lifting the leaves, owing to the need to bend down or kneel down to either pick up the leaves with the user's hands or to use one hand to hold leaves against the rake implement while holding the rake with the other hand.

The present inventor recognized the need for a device that eliminates need of and the stress, strain, and hassle of bending down or kneeling down to pick up leaves or loose materials. The present inventor recognized the need for a device to increase the ease and speed of gathering and lifting leaves or loose materials for disposal or transport. The present inventor recognized the need for a device that enables the user to easily use two hand tools, such as two rakes, at once cooperatively to gather and lift the leaves or loose materials. The present inventor recognized the need for a device that allows the two hand tools to be easily and quickly connected and disconnected so that the two hand tools can be used cooperatively or independently.

SUMMARY OF THE INVENTION

A device for connecting two rakes to gather and/or pick up loose materials is disclosed. Each rake has an elongated shaft handle connected to a rake implement comprising tines. The device has a first handle attachment and a second handle attachment.

The first handle attachment has a first rake handle channel, a first bottom end, a first top end, and an elongated first body extending between the first bottom end and the first top end. The first bottom end has a first aperture in communication with the first rake handle channel. The body comprises a first projection and a first recess. The first projection is adjacent the first recess.

The second handle attachment has a second rake handle channel, a second bottom end, a second top end, and an elongated second body extending between the second bottom end and the second top end. The second bottom end has a second aperture in communication with the second rake handle channel. The body comprises a second projection and a second recess. The second projection is adjacent the second recess.

The first projection is removably receivable in the second recess and the second projection is removably receivable in the first recess to join the first handle attachment to the second handle attachment. When the first projection is received in the second recess and the second projection received in the first recess, the first and second handle attachments comprise an open position where the first bottom end is spaced apart from the second bottom end and a closed position where the first bottom end is adjacent the second bottom end. The first handle attachment is completely user separable from the second handle attachment.

Numerous other advantages and features of the present invention will become readily apparent from the following detailed description of the invention and the embodiments thereof, from the claims, and from the accompanying drawings.

DETAILED DESCRIPTION

The following description is presented to enable any person skilled in the art to make and use the invention. For the purposes of explanation, specific nomenclature is set forth to provide a plural understanding of the present invention. While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIGS. 1-10 and 14 show a first embodiment of a device 10 for joining two hand tools, such as leaf rakes, to gather and/or pick up loose materials 35, 51. The device 10 comprises a first handle attachment 12 and a second handle attachment 14. The proximal end 13, 15 of each handle attachment 12, 14 comprises a shaft channel 16, 18. Handle shafts 24, 26 of hand tools 20, 22 are received in the shaft channel 16, 18 of the respective handle attachment 12, 14.

Figure 1:
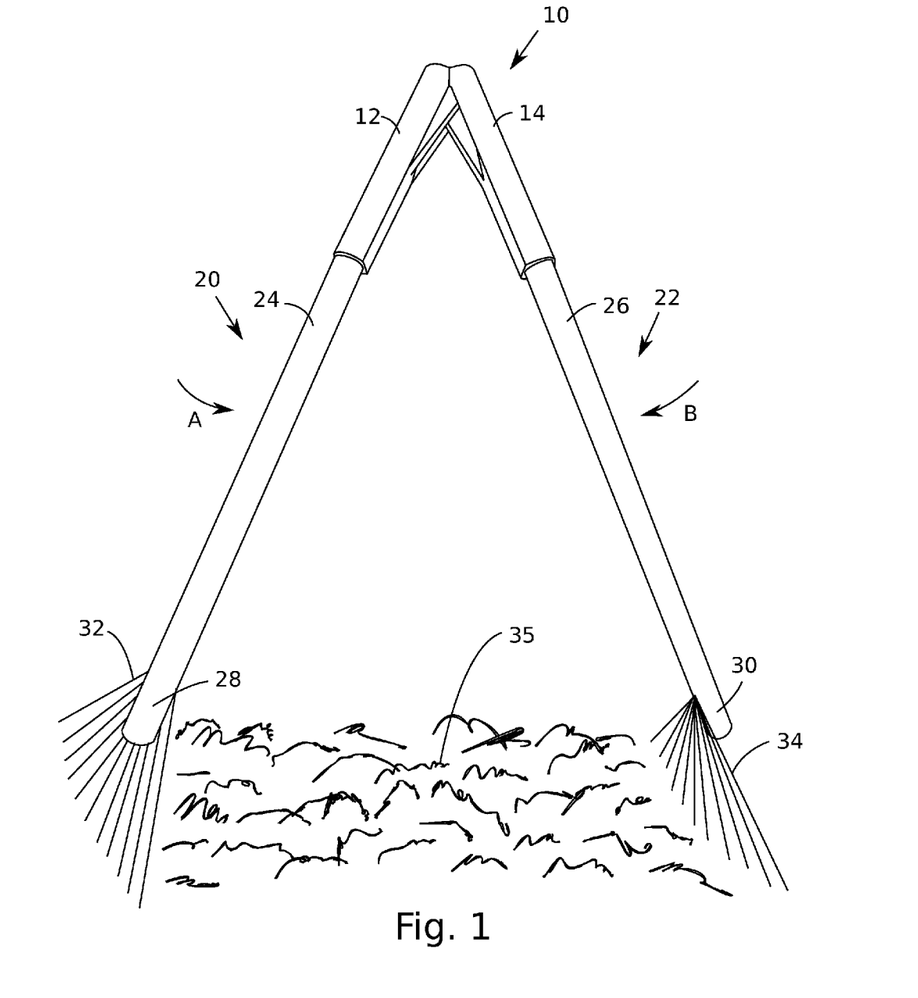
FIG. 1 is a perspective side view of the device of the present invention in an open position deployed in a first application.
Figure 2:
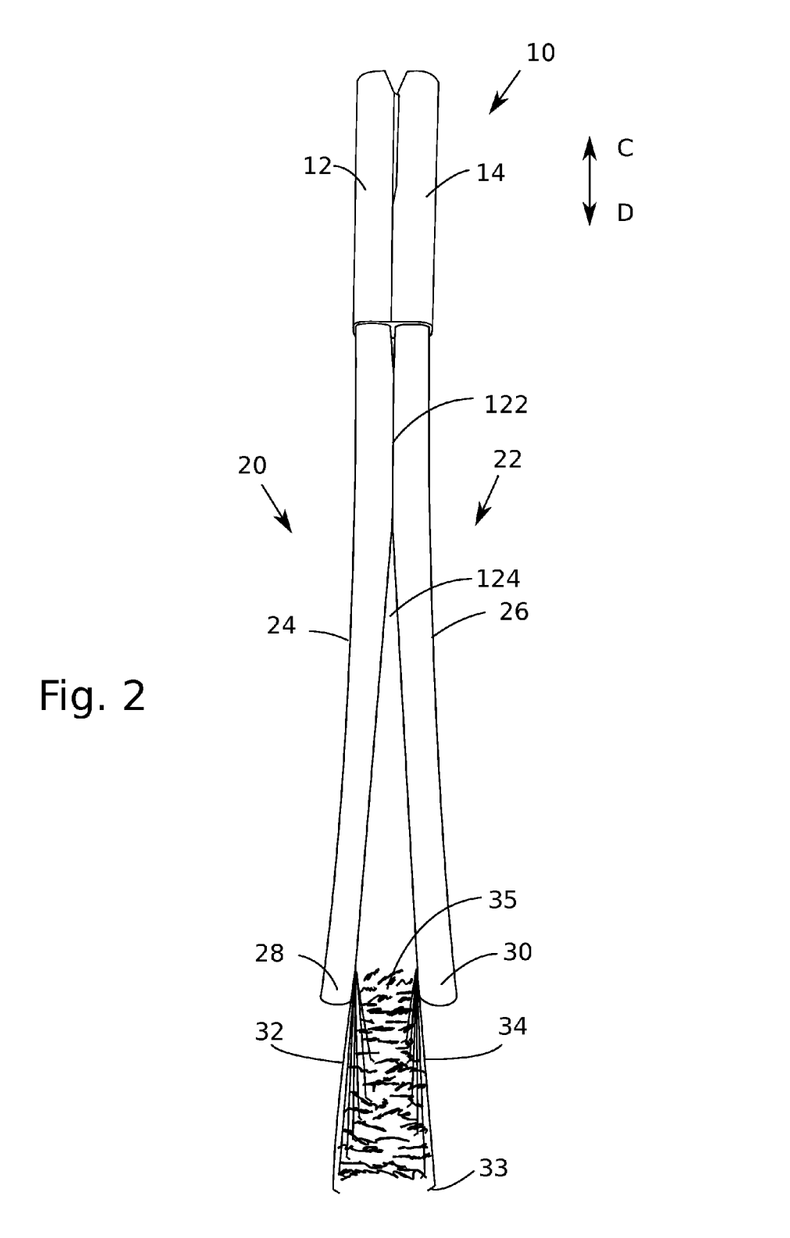
FIG. 2 is a perspective side view of the device of FIG. 1 in a closed position.
Figure 14:
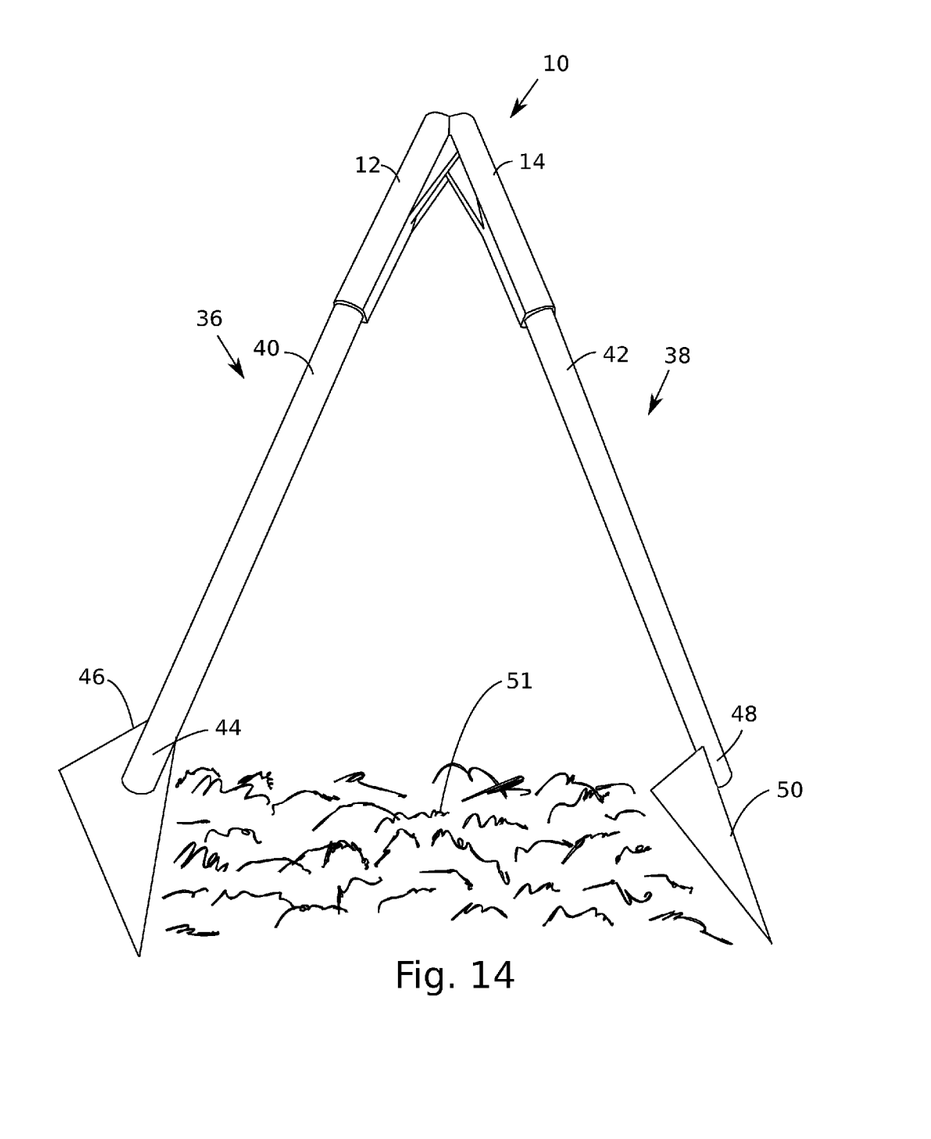
FIG. 14 is a perspective side view of the device of FIG. 1 in an open position deployed in a second application.

In some applications, as shown in FIGS. 1 and 2, the hand tools 20, 22 are leaf rakes. The leaf rakes comprise a rake implement having a plurality of tines 32, 34 at the distal end 28, 30 of each the leaf rake. The distal end of the tines may comprise inward projecting fingers 33. In some applications, as shown in FIG. 14, the hand tools are shovels 36, 38 and the handle attachments 12, 14 are attached to the proximal ends of the shafts 40, 42. The distal ends of the shafts 46, 48 comprise shovel implements 46, 50. The handle attachments 12, 14 can be deployed on other rakes, hand tools, garden tools, or other tools having elongated shaft handles.

The first handle attachment 12 is identical to the second handle attachment 14 so only the first handle attachment 12 will be described in detail except that the second handle attachment will be discussed where necessary to describe the interworking of the first handle attachment and second handle attachment.

Figure 8:
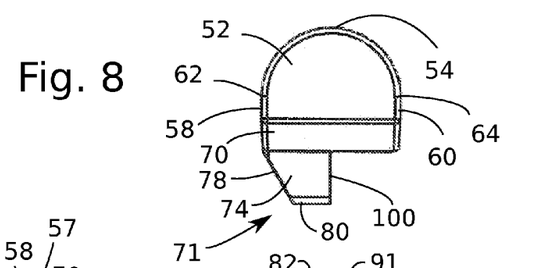
FIG. 8 is a top view of the first handle attachment of FIG. 6.
Figure 9:
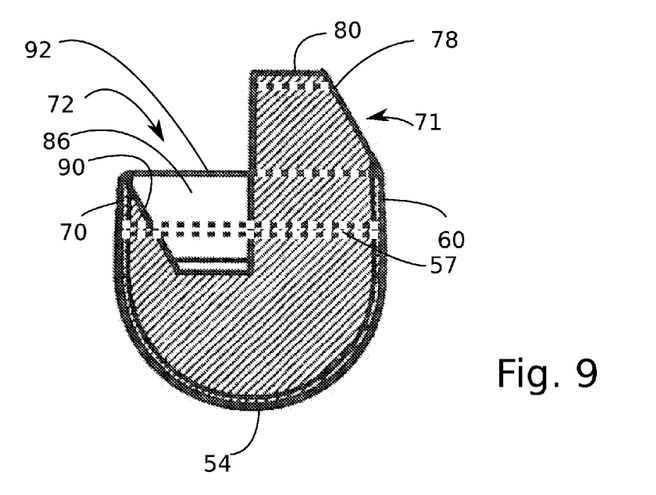
FIG. 9 is a section view of the first handle attachment of FIG. 6 taken along line 9-9 of FIG. 6.

The handle attachment 12 comprises a top side 52, a back side 54, a bottom side or proximal end 13, a left side 58, a right side 60, and a front side 56. The back side 54 is curved as shown in FIG. 8. The curved backside 54 is curved to provide a comfortable surface for the user's hands. In other embodiments, the backside may be square, or flat or another shape. The back side 54 meets the left side 58 at an intersection 62. The backside meets the right side 60 at an intersection 64.

The front side 56 comprises a lower portion 66, and interlocking portion 68, and an upper portion 70. The lower portion 66 comprises a flat surface. The upper portion 70 comprises a flat surface. The interlocking portion 68 comprises a projection 71 and a recess 72. In some embodiments, as shown in the drawings, the projection and recess comprise triangular shapes. In particular, the projection and recess comprises a scalene triangular shape. In some embodiments, the projection and recess can comprise other shapes such as rectangle, semi-circular, semi-elliptical, or the like.

Figure 7:
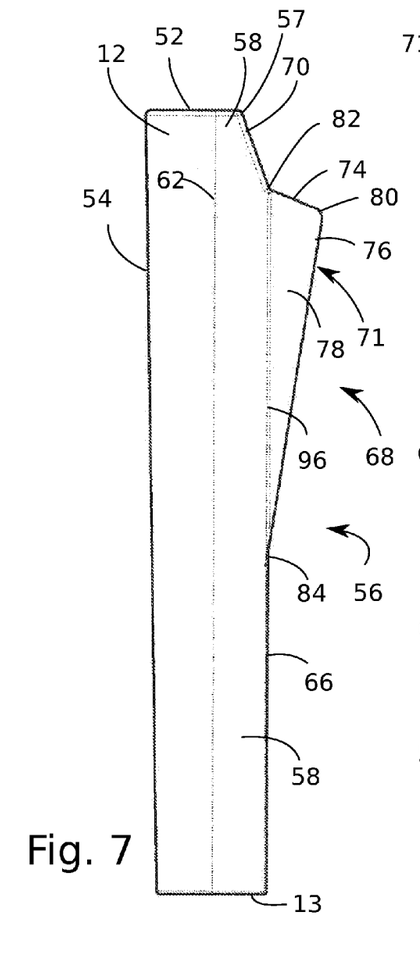
FIG. 7 is a left side view of the first handle attachment of FIG. 6.

The backside 54 joins and forms a right angle with the top side 52 as shown in FIG. 7. The backside joins and forms a right angle with the bottom side 13. The left and right sides 58, 60 are parallel with each other.

Figure 6:
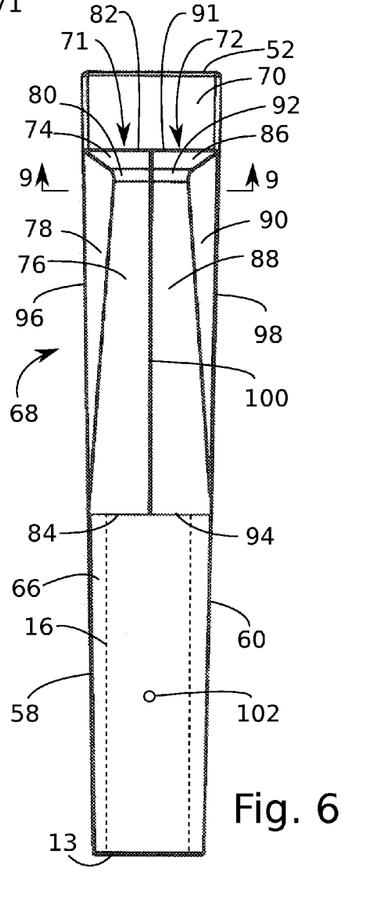
FIG. 6 is a front view of the first handle attachment of the device of FIG. 1.

The projection 71 comprises a first front inclined surface 74, a second front inclined surface 76, and a side inclined surface 78. The first front inclined surface 74 joins the second front inclined surface 76 at an apex 80. The side inclined surface 78 meets with the first front inclined surface 74, the second front inclined surface 76, and the apex 80 on the left side of each as shown in FIG. 6.

The first front inclined surface 74 meets the upper portion 70 at an upper valley 82. The second front inclined surface 76 meets the lower portion 66 at a lower intersection 84.

The recess 72 comprises a first front declined surface 86, a second front decline surface 88, and a side decline surface 90. The first front decline surface 86 joins the second front decline surface 88 at a recess valley 92. The side decline surface 90 meets the first front decline surface 86, the second front decline surface 88, and the recess valley 92 on the right side of each as shown in FIG. 6.

The first front decline surface 86 meets the upper portion 70 at an upper ridge 91. The second front decline surface 88 meets the lower portion 66 at a lower intersection 94.

The inclined surfaces 74, 76, 78 and the decline surfaces 86, 88, 90 make it easier for the projection to be inserted in the corresponding recess as the projection and recess will self-align the attachments 12, 14 as the projections are received into the recesses.

The left side 58 meets the side inclined surface 78 at a left side edge 96. The right side 60 meets the side declined surface 90 at a right side edge 98. Between the left side edge 96 and the right side edge 98 is an inside wall 100. The inside wall is where the projection 71 meets the recess 72.

The inside wall 100 forms a right angle with each of the first front inclined surface 74, the second front inclined surface 76, the first front decline surface 86, the second front decline surface 88. In some embodiments the inside wall 100 is equidistant from the right side edge 98 and the left side edge 96, and similarly, equidistant from the left side 58 and the right side 60.

In some embodiments, the lower portion 66 comprises a fastener aperture 102. The fastener aperture 102 provides communication with the shaft channel 16. A fastener such as a screw may be inserted through the fastener aperture when the handle attachment 12 is mounted on a shaft handle of a tool to secure the handle attachment to the tool handle. In some embodiments, the fastener aperture is equidistant between the lower intersection 94 and the bottom side 13. The fastener aperture may also be equidistant between the right side 58 and the left side 60.

Figure 10:
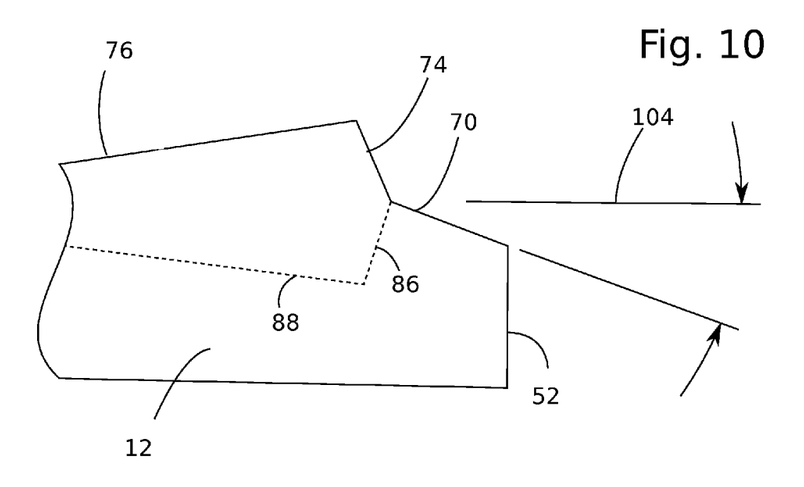
FIG. 10 is a partial right side view of the first handle attachment of FIG. 6.

In one embodiment, the intersection of the upper portion 70 with the first front inclined surface 74 forms a 132 degree angle. Referring to FIG. 10, line 104 is coplanar with the surface of the lower portion 66. A 20 degree angle is formed between the upper portion 70 and line 104. A 112 degree angle is formed between line 104 and the first front inclined surface 74. The first front inclined surface 74 is at a 68 degree angle to the surface of the lower portion 66.

In one embodiment, the first front decline surface 86 and the second front decline surface 88 are positioned in a laterally offset mirror image reflection about the plane of line 104 from the first front incline surface 74 and the second front include surface 76. In this manner, the projection 71 of the first handle attachment 12 will fit surface-to-surface contact or in close proximity thereto within the recess 116 of the second handle attachment 14. The first front incline surface 74 is arranged at 112 degrees from the plane of line 104 in a first direction and at 68 degree in the opposite direction.

In some embodiments, the top width of the top end 52 between the right side 58 and the left side 60 is 125% of the bottom width of the bottom end 13 between the right side 58 and the left side 60. In some embodiments, the top width is 1.25 inches and the bottom width is 1 inch. In some embodiments, the top width is equal to the bottom width. In some embodiments, the distance between the fastener aperture 102 and the bottom and 13 is 125% of the bottom width. In some embodiments, the depth between the rearmost portion of the backside 54 and the apex 80 is 158% of the bottom width.

In some embodiments, the ratio of the distance between a lower length of the lower intersection 84 to the bottom end 13 and a total length of the top side 52 to the bottom side 13 is 3 to 7. In some embodiments, the lower length is three times the bottom width and the total length is seven times the bottom width. In some embodiments, the lower length is 3 inches and the total length is 7 inches.

In some embodiments, an apex width between the side inclined surface 78 at the apex 80 and the inside wall 100 at the apex is 26.4 percent of the top width. In some embodiments, the apex width is 0.33 inch. In some embodiments, the channel 16 is cylindrical having a diameter of ⅞ of an inch.

In some embodiments, the shaft channel 16 extends from the bottom end 13 to the lower intersection 84. In some embodiments, the shaft channel 16 comprises a depth of beyond the bottom 13 but less than to the lower intersection 84. In some embodiments, the shaft channel has a depth of at least to the fastener aperture 102.

Figure 3:
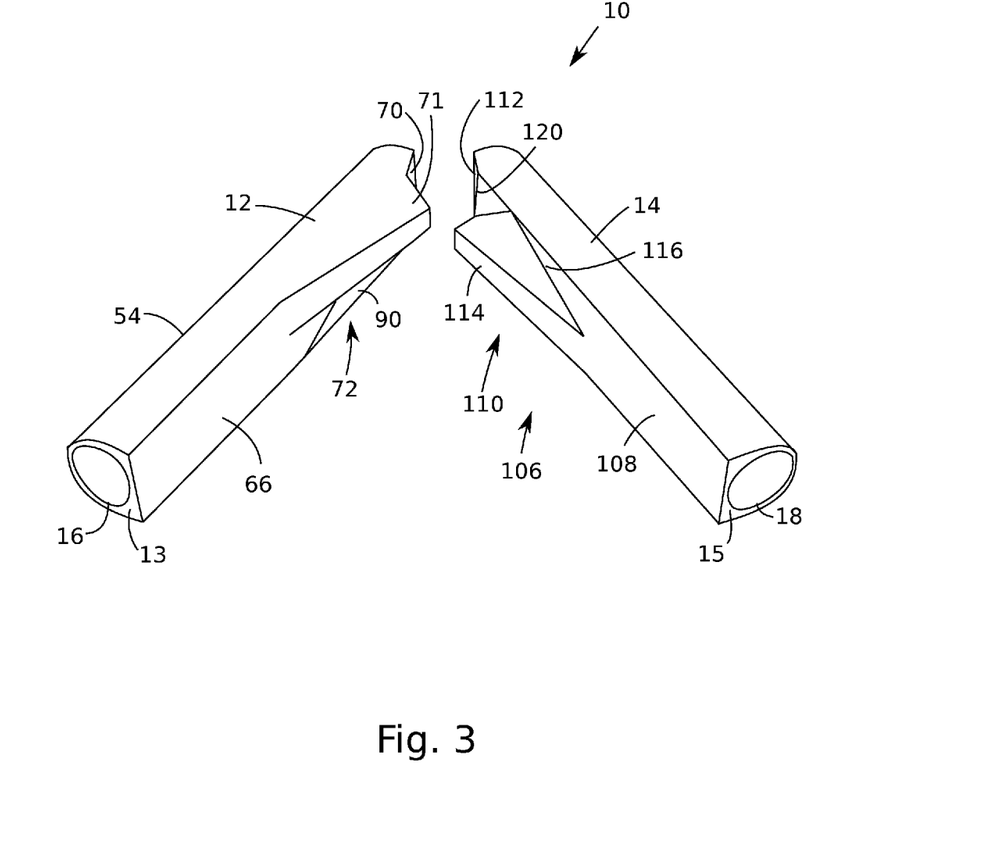
FIG. 3 is a perspective side view of the device of FIG. 1 with a first handle attachment disconnected from a second handle attachment of the device.

FIG. 3 shows the device 10 in a disconnected, spaced apart configuration. The second handle attachment 14 comprises a front side 106, a lower portion 108, an interlocking portion 110, and an upper portion 112. The interlocking portion 110 comprises a projection 114 and a recess 116.

Figure 4:
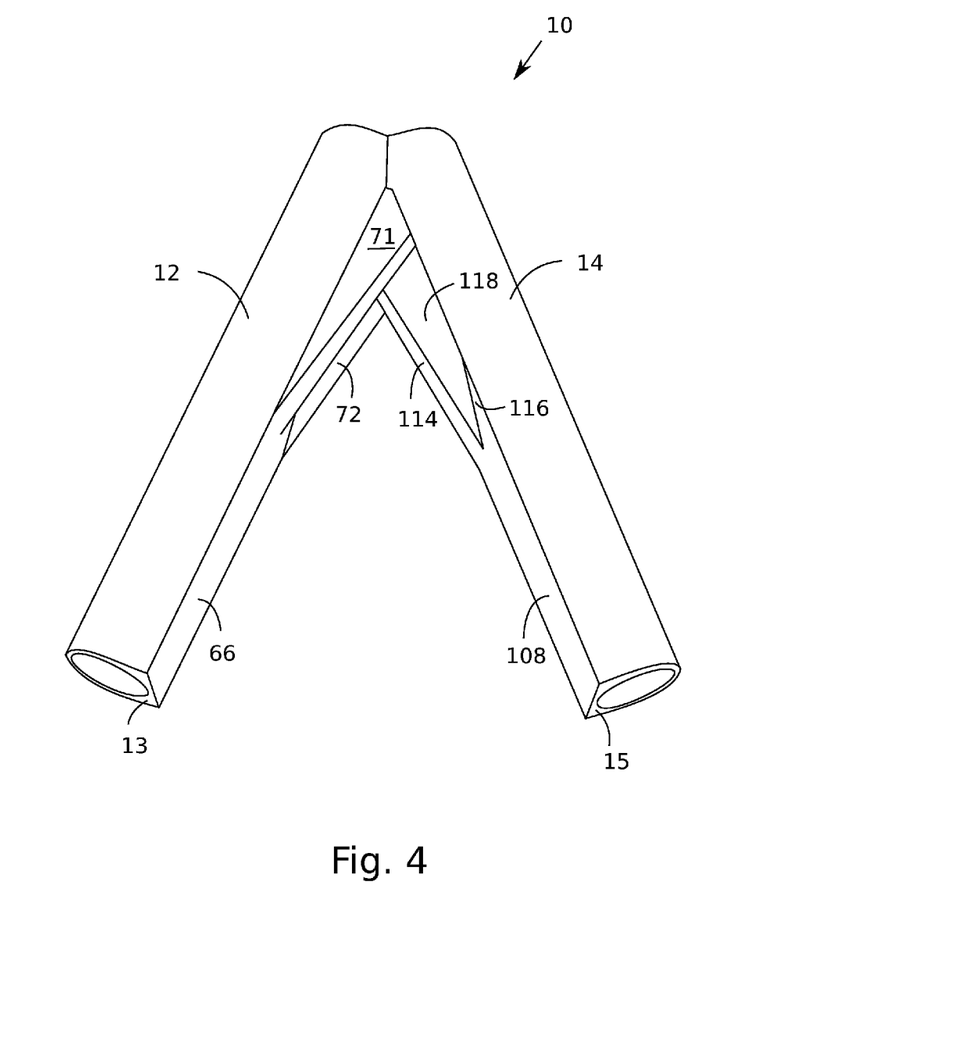
FIG. 4 is a perspective side view of the device of FIG. 1 in an open position.

FIGS. 1 and 4 show the device 10 in an engaged and open position. The upper portions 70 and 112 of the respective handle attachments 12, 14 are in surface-to-surface contact. Each projection 71, 114 is at least partially received in the corresponding recess 116, 72. In some embodiments, when the device is in the engaged and open position the first and second handle attachments are at 40 degrees from each other below the upper portions 70, 112. In some embodiments, number of degrees that the first and second handle attachments are from each other in the open position is two times the angle formed between the upper portion 70 and line 104.

It is possible to operate the device 10 opened beyond the open position shown in FIGS. 1 and 4. In such extend operation the lower portions of the upper portions 70, 112 will begin to separate from contact with each other. If the device is opened to the point where inside wall 100 of projection 71 is no longer in contact or laterally adjacent to the inside wall of projection 114, rotational stability will be reduced as the only contact will be at the upper portions 70, 112.

Figure 5:
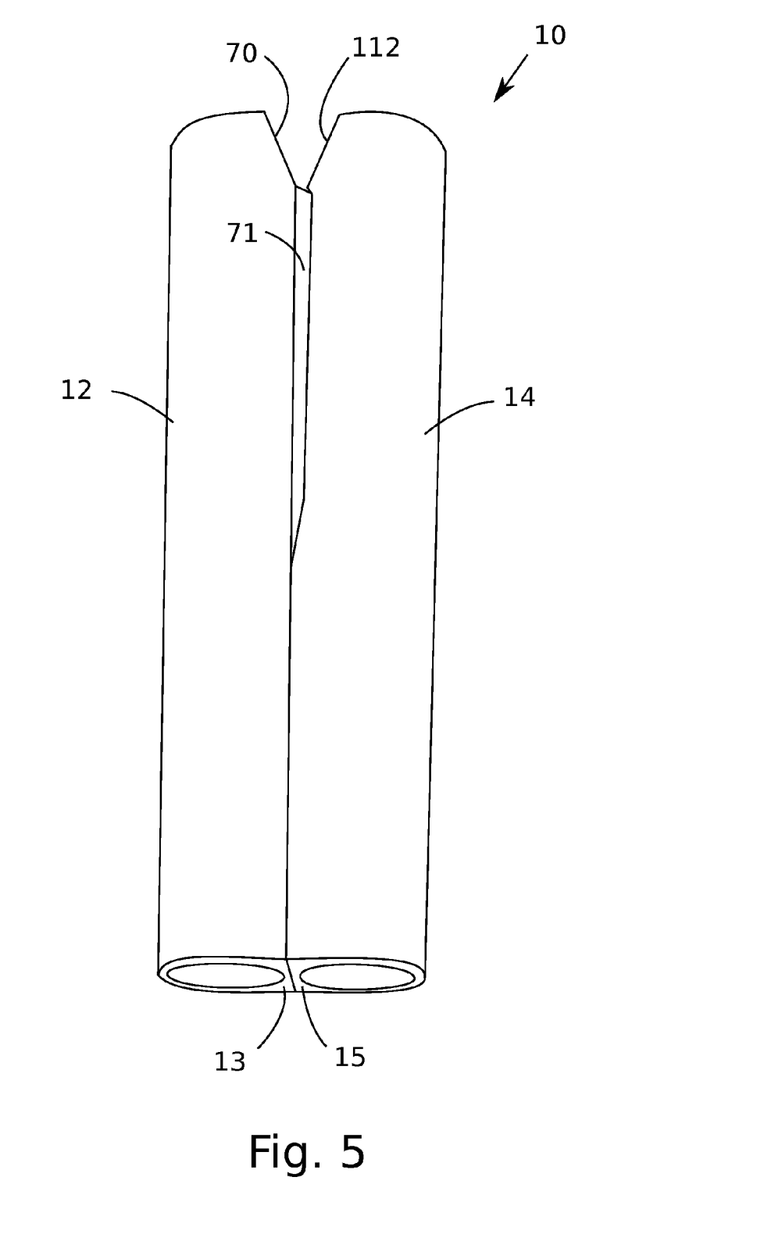
FIG. 5 is a perspective side view of the device of FIG. 1 in a closed position.

FIGS. 2 and 5 show the device 10 in an engaged and closed position. The upper portions 70 and 112 are spaced apart from each other. Each projection 71, 114 is fully received in the corresponding recess 116, 72, respectively. The lower portions 66, 108 are adjacent one another or in surface-to-surface contact.

The projection 71 of the first handle attachment 12 is in surface-to-surface contact or in close proximity with the walls of the recess 116 of the second handle attachment 14 when the device is in the engaged and closed position. Therefore, the first front inclined surface 74 is in contact or in close proximity to the first front decline surface of recess 116, the second front inclined surface 76 is in contact or close proximity to the second front decline surface of recess 116, the side inclined surface 78 is in contact or close proximity to the side decline surface of recess 116, the apex 80 is in contact or close proximity to the recess valley of recess 116, and the inside wall 100 is in contact or close proximity to the inside wall 118 of attachment 14.

FIG. 5 shows that a portion of projection 71 is visible. However, in some embodiments, no portion of projection 71 will be visible when the device is in the engaged and closed position. The right side edge of attachment 14 will be in contact or adjacent left side edge 96 of attachment 12.

FIG. 1 shows a device 10 deployed on the handle shaft ends of two rakes 20, 22. The shaft 24 of the first rake 20 is inserted into the channel 16 of the first handle attachment. The shaft 26 of the second rake 22 is inserted into the channel 18 of the second handle attachment 14. The attachment members or shafts are rotated or positioned so that the front side 56 of each attachment member is aligned with the working side of the tool, such as the side of the tines 32, 34 facing the debris to be collected 35.

The tool implements or tines 32, 34 of the rakes 20, 22 are placed on opposite sides of the loose debris 35 to be collected, with the working side of the tines facing the loose debris 35. One or both of the first or second handle attachments are leaned toward the other of the first or second handle attachments so that the first and second handle attachment contact each other. Then the user grasps either the shafts 24, 26 or the handle attachments 12, 14, or both, and applies force thereto. The force is applied on a side of the first rake shaft 24 or attachment 12 opposite the projection 71 and the force is applied on a side of the second rake shaft 26 opposite of the projection 114. The force applied moves the rakes 20, 22 and the attachments 12, 14 in the directions A and B respectively of FIG. 1 towards each other, pivoting at the connection between the attachments 12, 14. In doing so, the tines 32, 34 move the debris 35 together between the tines 32, 34 and compress the debris between the tines. The further away from the pivot point that force is applied, the easier debris will be compressed with less force.

The projections 71, 114 pivot against the respective recesses 116, 72. More particularly, the first front inclined surface 74 of attachment 12 pivots against an upper ridge 120 of attachment 14, and the upper inclined surface of attachment 14 pivots against the upper ridge 91 of attachment 12. Further, the upper valley 82 of attachment 12 pivots at and against the upper ridge 120 of attachment 14, and the upper valley of attachment 14 pivots at and against the upper ridge 91 of attachment 12. Whether the pivoting occurs along the upper inclined surface or at the upper valley against the corresponding upper ridge depends on the positioning by the user. With force applied by the user in the directions A or B or both, the upper valleys 82 (not labeled for attachment 14) are shaped to draw the corresponding upper ridges 120, 91 to seat and align in the corresponding upper valleys.

When in the engaged closed position, the interlocking of the projections 71, 114 with the corresponding recesses 116, 72, prevents the attachment 12 from moving in the directions C and D of FIG. 2 relative to attachment 14. Therefore, rake 20 is prevented from moving in directions C and D relative to rake 22. This keeps the implements or tines 32, 34 aligned vertically relative to the other. It also prevents the attachment 12 and corresponding rake 20 from rotating relative attachment 14 and rake 22 in the plane defined by or between surfaces of the lower portions 66 and 108.

FIG. 2 shows that the debris 35, such as leaves, are trapped between the tines 32, 34. This enables the user to lift the debris 35 with the rakes together as one unit so that the user may transport the trapped debris to a container, such as a leaf bag, trash bag, cargo bed, cargo box, or other container for disposal or transport. This eliminates the need of the user to bend down and use their hand or other implement to secure the debris against the tines 32.

In FIG. 2 shafts 24, 26 are shown in a bowed or arced condition. The shafts 24, 26 abut 122 each other adjacent the device 10, but separate to provide a gap 124 between the shafts adjacent the tines. This bowed configuration results from the compressive force in the directions A and B applied by the user at or about the abutting area 122 and the volume of space required by the debris 35 between the tines. The bowing may result from the use of material that is subject to bending such as wood or metal or the like. Bowing may occur to a greater or lesser degree depending on the volume of space required by the debris 35 between the tines, the amount of compressive force applied along the shafts or to the device 10, the particular location of the placement of compressive force along the vertical length of each shaft, and the type of material that comprises each shaft. In some applications and with some tools, no bowing will occur between the shafts 24, 26.

As each attachment 12, 14 is completely separable from the other, the tool 20 to which the attachment is connected can be used independently of the other tool 22. When it is desired to move, lift, or otherwise transport debris with both tools 20, 22, the attachment 12 can be interlocked with the attachment 14 via the respective projections and recesses.

After such joint use of tools 20, 22 is finished, one or both tools 20, 22 can thereafter be used independently, without the need of attending to any complex, bulky, time-consuming, or inconvenient mechanism for releasing the attachments 12, 14 from connection with the other.

In some embodiments, the tool 20, 22 has a shaft that in the range of 2 and 6 feet long, inclusive. In some embodiments, the tool 20, 22 has a shaft that is 4 feet long.

FIG. 14 shows that the device can be used with other tools, such as shovels 36, 38. The shovels can be used to pick of loose material 51, such as dirt, rocks, aggregate, snow, mulch, seed, etc. The shovels should also be used to pick up clay or other material that is not a loose material.

Figures 11, 12, 13:
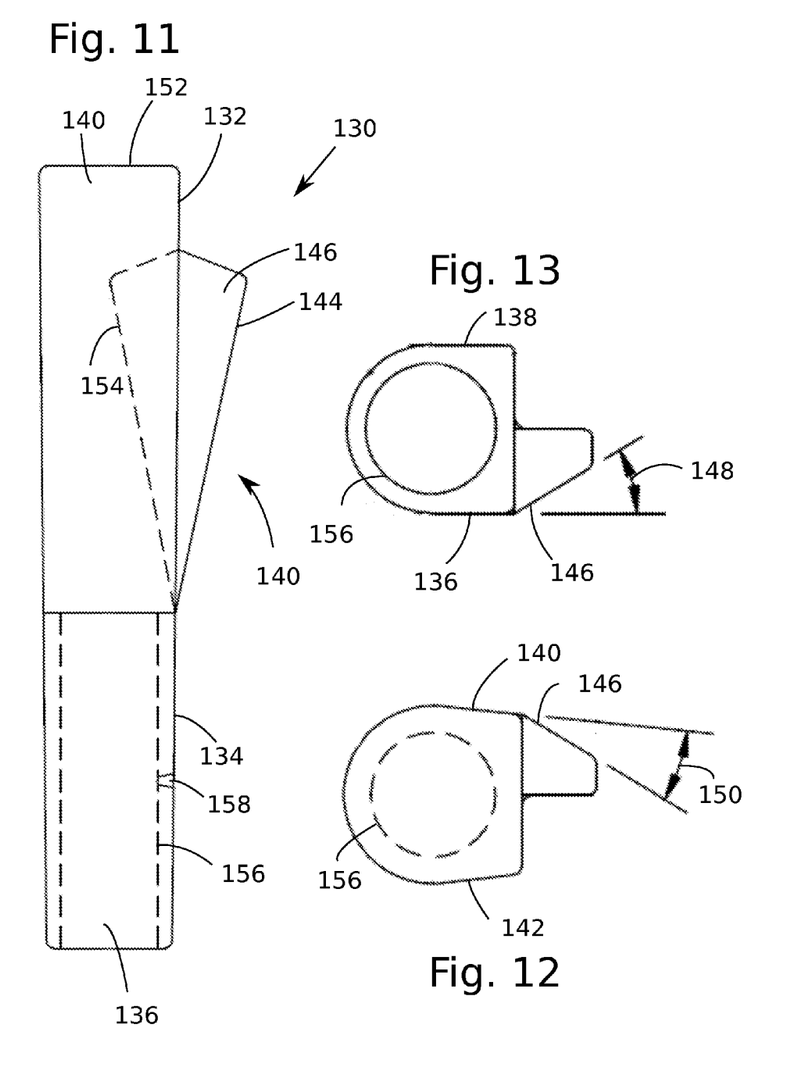
FIG. 11 is a side view of a first handle attachment of a second embodiment device of the invention.
FIG. 12 is a top view of the first handle attachment of FIG. 11.
FIG. 13 is a bottom view of the first handle attachment of FIG. 11.

FIGS. 11-12 show a second embodiment handle attachment 130 of a second embodiment device for gathering and picking up loose materials. The attachment 130 and second embodiment device are similar to attachment 12 and device 10 except as shown and described. The attachment 130 has a flat upper portion 132 which is co-planer with a lower surface 134. A lower left side 136 is parallel to a lower right side 138 adjacent the lower portion 134. An upper left side 140 is not parallel to an upper right side 142 adjacent the interlocking portion 140 and upper portion 132. Instead the upper left side 140 and the upper rights side 142 are angled toward each other.

In some embodiments, a side inclined wall 146 of a projection 144 is at a 31 degree angle 148 relative to the upper left side 140 adjacent the lower portion 134. The side inclined wall 146 is at a 25 degree angle 150 relative to the upper left side adjacent the upper portion 132.

The handle attachment 130 works with an identical attachment and interlocks projections 144 with recesses 154 in the same matter as attachments 12, 14, except that the attachment 130 has a reduced range of motion between a open and a closed position due to the flat upper portion 132 being perpendicular to an upper side 152 and also being co-planer with the surface of the lower portion 134. The attachment 130 receives the shaft of a tool in a shaft channel 156. The attachment 130 can optionally be secured to a shaft inserted in the channel 156 by securing a fastener, such as a screw (not shown), through the fastener aperture 158 and into the shaft.

In some embodiments, the shaft channel 16, 18, 156 can be sized to create a friction fit with the tool handle shaft to be connected. In some embodiments, the shaft channel 16, 18, 156 can be provided with an adhesive on the interior thereof to permanently or temporarily bond the attachment to the shaft of the tool.

In some embodiments, the attachment 12, 14 is cylindrical and the projection and recess interrupts the cylindrical side wall. The projection extends from the cylindrical side wall, the recess located adjacent to the projection on the cylindrical side wall. In some embodiments, the attachment 12, 14 is entirely cylindrical except for the interrupting projection and recess. In some embodiments, the attachment 12, 14 comprises a square, rectangular, triangular, quadrilateral, elliptical, or other shape in cross-section.

In some embodiments, the attachment comprises plastic, wood, metal, or other suitable natural or synthetic material.

In some embodiments, the upper portion 70 of the first handle attachment 12 comprises a first magnet and the upper portion 112 of the second attachment comprises a second magnet. When the upper portion 70 is moved sufficiently close to the upper portion 112 the magnetic force of attraction between the first magnet and the second magnet will draw the upper portion 70 into contact with the upper portion 112. The magnet may be flush with the surface of the upper surface or maybe closed behind the upper surface.

In some embodiments, the upper portion 70 of the first handle attachment 12 comprises a first hook or loop material of a hook and loop fastener and the upper portion 112 of the second attachment comprises the other of the hook or loop material of the hook and loop fastener. The hook and loop fastener will assist in holding the upper portion 70 in user releasable contact with the upper portion 112.

In some embodiments, the first and second handle attachments are not identical, but the first projection and recess of the first handle attachment is substantially identical to the second projection and recess of the second handle attachment.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A joining device for two rakes, each rake comprising an elongated handle connected to a rake implement comprising tines, the device comprising:
   a first handle attachment configured to be connected to a first rake handle, the first handle attachment comprising a first bottom end, a first top end, and an elongated first body extending between the first bottom end and the first top end,
      the first body comprises a first projection and a first recess, the first projection is adjacent the first recess;
   a second handle attachment configured to be connected to a second rake handle, the second handle attachment comprising a second bottom end, a second top end, and an elongated second body extending between the second bottom end and the second top end,
      the second body comprises a second projection and a second recess, the second projection is adjacent the second recess;
   the first projection is removably receivable in the second recess and the second projection is removably receivable in the first recess to join the first handle attachment to the second handle attachment;
   the second recess comprises at least one unimpeded exit path in a direction opposite of an inner wall of the second recess configured to permit the first projection an unimpeded withdrawal from the second recess, the first recess comprises at least one unimpeded exit path in a direction opposite of an inner wall of the first recess configured to permit the second projection an unimpeded withdrawal from the first recess;
   when the first projection is received in the second recess and the second projection received in the first recess, the first and second handle attachments are movable between an open position where the first bottom end is spaced apart from the second bottom end and a closed position where the first bottom end is adjacent the second bottom end;
   the first handle attachment is completely user separable from the second handle attachment.

2. The device of claim 1, wherein the second projection is identical to the first projection and the second recess is identical to the first recess.

3. The device of claim 2, wherein the second handle attachment is identical to the first handle attachment.

4. The device of claim 1, wherein the first handle attachment comprises a first rake handle channel, the first bottom end comprises a first aperture in communication with the first rake handle channel; wherein the second handle attachment comprises a second handle channel, the second bottom end comprises a second aperture in communication with the second rake handle channel.

5. The device of claim 1, wherein the first projection shares a first common wall with the first recess and the second projection shares a second common wall with the second recess.

6. The device of claim 1, wherein a first projection inside wall of the first projection is co-planer with a first recess inside wall of the first recess, and a second projection inside wall of the second projection is co-planer with a second recess inside wall of the second recess.

7. The device of claim 1, wherein the first handle attachment comprises a first rake handle channel, the first bottom end comprises a first aperture in communication with the first rake handle channel; wherein the second handle attachment comprises a second handle channel, the second bottom end comprises a second aperture in communication with the second rake handle channel; wherein the first projection, the first recess, the second projection, and the second recess each comprises a triangular shape.

8. The device of claim 1, wherein the first projection, the first recess, the second projection, and the second recess each comprises a scalene triangular shape where a shortest side of the scalene triangular shape for each is adjacent the first top end or the second top end.

9. The device of claim 1, wherein the first recess comprises a shape of the second projection and the second recess comprises a shape of the first projection.

10. The device of claim 1, wherein
the first body comprises a first upper surface, a first valley intersection, and a first ridge intersection, the first upper surface located above the first projection and the first recess, the first valley intersection formed between the first upper surface and the first projection, the first ridge intersection formed between the first upper surface and the first recess;
the second body comprises a second upper surface, a second valley intersection, and a second ridge intersection, the second upper surface located above the second projection and the second recess, the second valley intersection formed between the second upper surface and the second projection, the second ridge intersection formed between the second upper surface and the second recess;
the first and second handle attachments are pivotal between the open position and the closed position where the second ridge intersection mates with and pivots at the first valley intersection and the first ridge intersection mates with and pivots at the second valley intersection.

11. The device of claim 1, wherein
the first body comprises a first front wall, the first front wall comprises the first projection, the first recess, a first lower surface, and a first upper surface; and,
the second body comprises a second front wall, the second front wall comprises the second projection, the second recess, a second lower surface, and a second upper surface; and,
the first lower surface is in contact with or adjacent to the second lower surface when in the closed position, the first upper surface is in contact with or adjacent to the second upper surface when in the open position.

12. The device of claim 11, wherein the first lower surface, the first upper surface, the second lower surface, and the second upper surface are each flat surfaces.

13. The device of claim 11, wherein the first upper surface is at an acute angle to a plane of the first lower surface.

14. The device of claim 1, wherein the first handle attachment comprises a first rake handle channel, the first bottom end comprises a first aperture in communication with the first rake handle channel; wherein the second handle attachment comprises a second handle channel, the second bottom end comprises a second aperture in communication with the second rake handle channel; wherein the first body comprises a first fastener aperture in communication with the first rake handle channel; wherein the second body comprises a second fastener aperture in communication with the second rake handle channel.

15. The device of claim 1, wherein the first and second projections comprise a plurality of inclined surfaces and the first and second recess comprises a plurality of declined surfaces, and one or more of the plurality of inclined surfaces interact with one or more the plurality of declined surfaces when the projections are inserted into the recess to align the first handle attachment with the second handle attachment.

16. A joining device for two rakes, each rake comprising an elongated handle connected to a rake implement comprising tines, the device comprising:
a first handle attachment comprising a first bottom end, a first top end, and an elongated first body extending between the first bottom end and the first top end,
the first body comprises a first projection and a first recess, the first projection is adjacent the first recess;
a second handle attachment comprising a second bottom end, a second top end, and an elongated second body extending between the second bottom end and the second top end,
the second body comprises a second projection and a second recess, the second projection is adjacent the second recess;
the first projection is removably receivable in the second recess and the second projection is removably receivable in the first recess to join the first handle attachment to the second handle attachment;
the second recess comprises at least one unimpeded exit path in a direction opposite of an inner wall of the second recess configured to permit the first projection an unimpeded withdrawal from the second recess, the first recess comprises at least one unimpeded exit path in a direction opposite of an inner wall of the first recess configured to permit the second projection an unimpeded withdrawal from the first recess;
the first handle attachment and the second handle attachment are pivotable, at a first junction between the first projection and the second recess and a second junction between the second projection and the first recess, between an open position where the first bottom end is spaced apart from the second bottom end and a closed position where the first bottom end is adjacent the second bottom end;
the first handle attachment is completely user separable from the second handle attachment.

17. The device of claim 16, wherein the first and second projections are elongated and the first and second recesses are elongated; wherein the first handle attachment comprises a first rake handle channel, the first bottom end comprises a first aperture in communication with the first rake handle channel; wherein the second handle attachment comprises a second handle channel, the second bottom end comprises a second aperture in communication with the second rake handle channel.

18. The device of claim 16, wherein the second projection is identical to the first projection and the second recess is identical to the first recess; the first projection, the first recess, the second projection, and the second recess each comprises a scalene triangular shape where a shortest side of the scalene triangular shape for each is adjacent the first top end or the second top end.

19. The device of claim 16, wherein
the first body comprises a first front wall, the first front wall comprises the first projection, the first recess, a first lower surface, and a first upper surface; and,
the second body comprises a second front wall, the second front wall comprises the second projection, the second recess, a second lower surface, and a second upper surface; and,
the first lower surface is in contact with or adjacent to the second lower surface when in the closed position, the first upper surface is in contact with or adjacent to the second upper surface when in the open position.

20. A method of gathering and lifting leaves using two rakes, comprising the steps of:
placing a first rake adjacent to leaves to be collected, where the first rake comprises a first handle shaft connected to a first rake tines, a first handle attachment is attached to the first handle shaft opposite the first rake tines, the first rake tines of the first rake are facing the leaves, a first projection and a first recess of the first handle attachment orientated in a direction of a working side of the first rake tines;
placing a second rake adjacent to leaves to be collected and opposite the first rake, where the second rake comprises a second handle shaft connected to a second rake tines, a second handle attachment is attached to the second handle shaft opposite the second rake tines, the second rake tines of the second rake are facing the leaves, a second projection and a second recess of the second handle attachment orientated in a direction of a working side of the second rake tines;
leaning one or both of the first or second handle attachments toward the other of the first or second handle attachments so that the first and second handle attachments contact each other;
applying a force to the first rake and the second rake, where the force is applied on a side of the first rake opposite the first projection and the force is applied on a side of the second rake opposite of the second projection;
moving the first projection into the second recess and the second projection into the first recess in a pivoting motion and compressing the leaves between the first rake tines and the second rake tines;
lifting the first and second rakes with the compressed leaves between the first and second rake tines.

* * * * *